(12) United States Patent
Cho et al.

(10) Patent No.: US 7,899,084 B2
(45) Date of Patent: Mar. 1, 2011

(54) METHOD AND SYSTEM FOR GENERATING SWITCHING TIMING SIGNAL FOR SEPARATING TRANSMITTING AND RECEIVING SIGNAL IN OPTICAL REPEATER OF MOBILE TELECOMMUNICATION NETWORK USING TDD AND OFDM MODULATION

(75) Inventors: Woungsik Cho, Seoul (KR); Younghoon Chun, Seoul (KR)

(73) Assignee: SK Telecom Co., Ltd. (KR)

( * ) Notice: Subject to any disclaimer, the term of this patent is extended or adjusted under 35 U.S.C. 154(b) by 610 days.

(21) Appl. No.: 11/572,780

(22) PCT Filed: Jul. 29, 2005

(86) PCT No.: PCT/KR2005/002484

§ 371 (c)(1),
(2), (4) Date: Jan. 26, 2007

(87) PCT Pub. No.: WO2006/011778

PCT Pub. Date: Feb. 2, 2006

(65) Prior Publication Data

US 2007/0237181 A1    Oct. 11, 2007

(30) Foreign Application Priority Data

Jul. 29, 2004    (KR) ............... 10-2004-0059582

(51) Int. Cl.
*H04B 10/00* (2006.01)
*H04B 10/24* (2006.01)

(52) U.S. Cl. ............... 370/503; 375/215; 398/115

(58) Field of Classification Search ............... 375/362, 375/737, 37, 376, 215; 370/503, 515, 518, 370/519; 398/41, 52, 115
See application file for complete search history.

(56) References Cited

U.S. PATENT DOCUMENTS

| | | | | | |
|---|---|---|---|---|---|
| 3,629,712 | A | * | 12/1971 | Clark | 327/12 |
| 4,754,450 | A | * | 6/1988 | Lynk et al. | 370/280 |
| 5,815,541 | A | * | 9/1998 | Fukushi | 375/376 |
| 6,122,083 | A | * | 9/2000 | Ohta et al. | 398/1 |
| 6,940,827 | B2 | * | 9/2005 | Li et al. | 370/278 |
| 7,457,378 | B1 | * | 11/2008 | Sher et al. | 375/345 |
| 2001/0017896 | A1 | * | 8/2001 | Murakami et al. | 375/260 |
| 2003/0189917 | A1 | * | 10/2003 | Sudo | 370/347 |
| 2004/0071234 | A1 | * | 4/2004 | Li | 375/341 |
| 2004/0081205 | A1 | * | 4/2004 | Coulson | 370/503 |

\* cited by examiner

*Primary Examiner*—Huy D Vu
*Assistant Examiner*—Benjamin Lamont
(74) *Attorney, Agent, or Firm*—Baker & Hostetler LLP (57) ABSTRACT

Disclosed are a method and system for generating switching a timing signal for separating a transmitting and receiving signal in an optical repeater of a mobile telecommunication network by using a Time Division Duplex (hereinafter, referred to as "TDD") scheme and an Orthogonal Frequency Division Multiplexing (hereinafter, referred to as "OFDM") modulation scheme, which transmits a part of a RF signal extracted from a coupler included in a remote of an optical repeater to a switching timing signal generating circuit, locates a frame start position of a RF signal by correlating a reference signal generated in a switching timing signal generating circuit with a RF signal extracted from a coupler, and is capable of transmitting a RF signal by distinguishing between a downlink signal and a uplink signal by using a switching timing signal in a switch when calculating a starting point of a downlink signal and a uplink signal included in an RF signal on the basis of a frame starting location, generating a switching timing signal by using it, and transmitting to a remote's switch.

31 Claims, 7 Drawing Sheets

METHOD AND SYSTEM FOR GENERATING SWITCHING TIMING SIGNAL FOR SEPARATING TRANSMITTING AND RECEIVING SIGNAL IN OPTICAL REPEATER OF MOBILE TELECOMMUNICATION NETWORK USING TDD AND OFDM MODULATION

FIELD OF THE INVENTION

The present invention relates to a method and system for generating a switching timing signal for separating a transmitting and receiving signal in an optical repeater of a mobile telecommunication network by using a Time Division Duplex (hereinafter, referred to as "TDD") scheme and an Orthogonal Frequency Division Multiplexing (hereinafter, referred to as "OFDM") modulation scheme. More particularly, the present invention relates to a method and system for generating switching a timing signal for separating a transmitting and receiving signal in an optical repeater of a mobile telecommunication network by using a TDD scheme and an OFDM modulation scheme, which transmits a part of a RF signal extracted from a coupler of a remote to a switching timing signal generating circuit when a RF signal transmitted from an Access Point (hereinafter, referred to as "AP") is transmitted to a remote via a main donor of an optical repeater, locates a frame start position of a RF signal by correlating a reference signal generated in a switching timing signal generating circuit with a RF signal extracted from a coupler, and is capable of transmitting a RP signal by distinguishing between a downlink Signal and a uplink signal by using a switching timing signal in a switch when calculating a starting point of a downlink signal and a uplink signal which is included in an RF signal on the basis of a frame starting location, and transmitting to a remote's switch after generating a switching timing signal by using it.

BACKGROUND OF THE INVENTION

A variety of wireless communication services using a wireless network are provided as computer, electronic and communication technology develops by leaps and bounds. A most basic wireless communication service, which is a wireless voice communication service providing voice communication for subscribers of mobile communication terminal by wireless scheme, has a characteristic to provide service regardless of time and place. Further, besides supplementing a voice communication service by providing a message service, a wireless internet service is brought up recently which provides an Internet communication service for subscribers of mobile communication terminal through a wireless communication network.

Herein, services which are provided by Code Division Multiple Access (hereinafter, referred to "CDMA") mobile communication system have been developed not only to a voice service but also to multimedia communication services which transmit and receive data such as circuit data, packet data and etc.

Further, recently, an International Mobile Telecommunication 2000 (hereinafter, referred to as IMT-2000), which is the 3G mobile communication system, has been commercialized by the development of information and communication. The IMT-2000 is the service which is a CDMA 2000 1x, 3x, EV-DO, WCDMA (Wideband CDMA) and etc., and can provide a wireless internet at transmission rate, more than 144 Kbps much faster than 14.4 Kbps or 56 Kbps, data transmission rate supported in IS-95A and IS-95B network, by using IS-95C network developed from an existing IS-95A and IS-95B network. In Particular, if using IMT-2000 service, it is possible to provide various multimedia services (for example AOD, VOD and etc.) at much faster rate as well as the improvement of existing voice and WAP services quality.

However, due to high cost for constructing a base station, the charge for using is high in an existing mobile communication system. Further, due to a small screen size of a mobile communication terminal, there is a limit to provide very high speed wireless internet services for example a limit to use contents. Furthermore, there is a limit to provide public services owing to the problem of radio wave interference and narrow using coverage in Wireless Local Area Network (hereinafter, referred to as WLAN). Therefore, in order to guarantee portability and mobility, and provide very high speed wireless internet services at a lower charge, mobile internet technology is emerged which uses a TDD scheme for a duplex scheme and uses a OFDM scheme for a modulation scheme.

Herein, the TDD scheme is a two-way transmission scheme which allocates uplink and downlink in turns timely at the same frequency band. The TDD scheme has higher efficiency than a Frequency Division Duplex (hereinafter, referred to as FDD) scheme allocating two different frequency to uplink and downlink, and has a characteristic to be suitable for transmitting asymmetric or bursting applications.

Herein, an OFDM scheme is a next generation communication scheme adopted as a standard of a wireless LAN (802.11g,a), a W-MAN (802.16), a digital broadcasting, a VDSL and etc., and is a digital modulation scheme for improving transmission speed per band width and preventing multipath interference. The biggest characteristic of the OFDM scheme is to have a orthogonality between sub-carriers. That is, it is possible to have an excellent characteristic in multipath fading and to improve transmission content largely by adjusting data transmission rate corresponding to each sub-carrier in the ration of signal to noise in a particular sub-carrier. Furthermore, the OFDM scheme has a strong characteristic in narrow-band interference because it has influence only on some sub-carriers.

However, the OFDM scheme has a characteristic to be sensitive to frequency offset of a carrier and phase noise, which becomes a main cause to affect the security of orthogonality, that is, to deteriorate the capacity of a system, to have relatively a high ratio of average power to the maximum power comparative to one of a single carrier modulation, and to decrease power efficiency of an RF power amplifier. It is possible to overcome the interference between symbols due to multipath channel while it is impossible to reconstruct the signal transmitted to the sub-channel when the attenuation of a particular sub-channel is serious. In order to prevent this, it is possible to solve the problem using error correction code which is called a Coded OFDM (hereinafter, referred to as "COFDM"). Herein, it is possible to use both block code such as Reed-Solomon code and convolutional code as the error correction codes and to take an advantage of a connection code coupling the two codes, turbo codes and etc., too.

There is a High-speed Portable internet (hereinafter, referred to as "HPi") system as representative portable internet technology. The HPi system is the next generation wireless internet technology which the Telecommunications Technology Association (hereinafter, referred to as "TTA") is developing in association with Samsung Electronics Co., Ltd. and the Electronics and Telecommunications Research Institute (hereinafter, referred to as "ETRI").

The HPi system uses the frequency band of 2.3 GHz and, as described above, uses the TDD as a duplex scheme and the OFDM as a modulation scheme. Furthermore, the HPi system provides the mobility of 60 Km/h and is a wireless data system which has uplink and downlink asymmetric transmission characteristic considering a downlink transmission speed is 24.8 Mbps but a uplink transmission speed is 5.2 Mbps.

Figure 1:
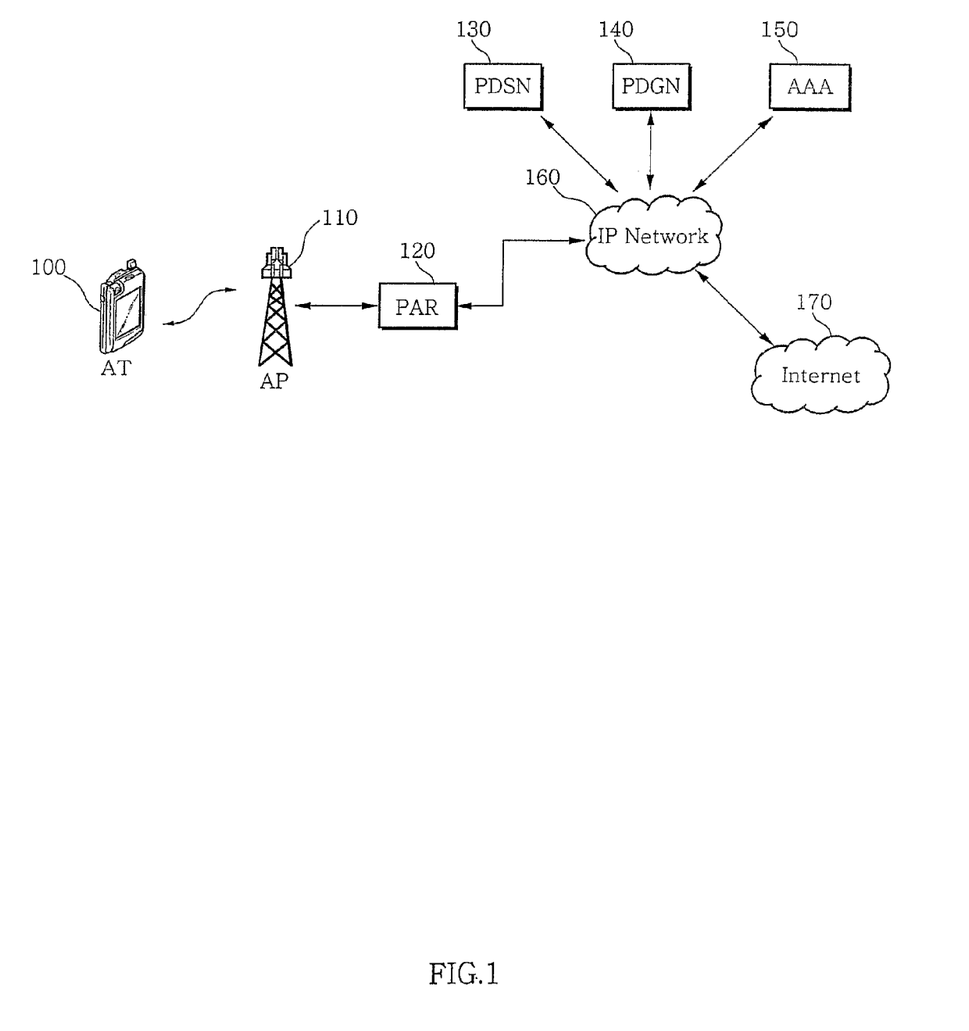
FIG. 1 is a diagram schematically showing a an HPi system.

FIG. 1 is a diagram schematically showing an HPi system.

As shown in FIG. 1, the HPi system may include an Access Terminal 100 (hereinafter, referred to as "AT"), an Access Point 110 (hereinafter, referred to as "AP"), a Packet Access Router 120 (hereinafter, referred to as "PAR"), a Packet Data Serving Node 130 (hereinafter, referred to as "PDSN"), a Packet Data Gateway Node 140 (hereinafter, referred to as "PDGN"), an Authentication Authorization Accounting 150 (hereinafter, referred to as "AAA"), an IP network 160 and an internet 170.

Herein, the AT 100 refers to a mobile communication terminal which uses a very high speed wireless internet service by connecting with the HPi system and has low power Radio Frequency (hereinafter, referred to as "RF")/Intermediate Frequency (hereinafter, referred to as "IF") module and controller function, a Media Access Control (hereinafter, referred to as "MAC") frame variable control function depending on service characteristics and radio wave circumstance, a handover function, authentication and encryption functions and etc.

The AP 110 transmits the data received from PAR 120 as a base station of the HPi system, and has a low-power RF/IF module and controller function, OFDMA/TDD packet scheduling and channel multiplex function, an MAC frame variable control function depending on service characteristics and radio wave circumstances, a 50 Mbps high speed traffic realtime control function, a handover function, and etc.

Further, the AT 100 and the AP 110 have a 50 Mbps packet transmission modulating demodulating function for data transmission, a high packet channel coding function, a realtime modem control function, and etc.

The PAR 120 is a packet access router which accommodates a number of the AP 110, has a handover control function of AP 100, a handover control function of the PAR 120, a packet routing function, an internet connection function and etc., and further connects with IP network.

The PDSN 130 relay transmitting and receiving of packet data between an external packet data service server such as the internet 170, etc. and a base station through the IP network 160 and administers the location information data of a mobile communication terminal including the AT 100.

The PDGN 140 performs a routing which traces and then connects with an external packet data service server of the internet 170, etc. Further, the AAA 150 links the PDSN 130, carries out accounting for a packet data used by the AT 100 and authenticates the connection with the AP 100.

The IP network 160 connects with the PDSN 130, PDGN 140 and the AAA 150, and then transmits a packet data received from an external packet data service server such as the internet 170, etc. to the AP 100.

Meanwhile, in a mobile communication system, a mobile communication service region has been generally divided into a plurality of cells using a frequency reuse concept in order to extend the coverage of a mobile communication network and a Base Station (hereinafter, referred to as "BS") have been installed around the center of each of the cells in order to handle the mobile communication service. Herein, the ratio of a cell is set depending on the strength of a signal or the amount of data traffic. That is, the ratio of a cell is set small in an urban center in which there is much amount of traffic and the ratio of a cell is set large in a suburb in which there is comparatively less amount of data traffic so that the amount of traffic should not exceed the treatment content of the wireless BS handling a corresponding mobile communication service.

There have been shade regions of radio waves such as a basement, a building's interior, a tunnel, etc. which it is difficult for the radio wave to reach in spite of these effort to support better mobile communication services controlling the ratio of a cell depending on the frequency reuse concept or the amount of traffic, etc. It may cause undesirable results in cell-construction as well as in weakening the economical efficiency due to equipping expenses, installing expenses and maintenance and repair expenses, etc. to equip a plurality of new base stations for solving the shade of radio wave in the shade regions of radio wave.

In order to solve the above-mentioned problem, it is possible to provide mobile communication services using an optical repeater system in these shade regions of radio waves. The optical repeater system can solve the problem of the shade of radio wave by allowing a communication channel allocated to a base station to transmit to the shade region of radio waves through an optical transmission scheme using the optical transmission scheme. Particularly, it is preferable to use an optical repeater having a small cell ratio because a radio waves loss is more, a diffraction effect is small, and building transmission loss is large in 2.5G, PCS, and 3G using a higher frequency than a 2G mobile communication system.

Meanwhile, in order to repeat a wireless signal between a base station and a terminal, the optical repeater might be capable of distinguishing an uplink signal from a downlink signal. The optical repeater of a mobile communication system must distinguish an uplink signal from a downlink signal by using a duplex when using the FDD scheme. However, it is impossible to distinguish an uplink signal from a downlink signal by using a duplex because it uses the same frequency in order to distinguish an uplink signal from a downlink signal when using the TDD scheme like the HPi system, etc. Accordingly, the optical repeater using the TDD scheme is able to distinguish an uplink signal from a downlink signal by using a switch and provide a path for each signal selectively. In order to do this, it is necessary for the controlling signal to distinguish between the starting point of a downlink signal and the one of an uplink signal exactly and to change a shifting path by controlling the path of a switch depending on each of signals. In addition, the optical repeater can receive the controlling signal described above.

However, because manufacturers of base stations and optical repeaters are generally various, in order to receive a switch controlling signal transmitted from a base station, it causes problems that an extra fee is needed for installing another modem in an optical repeater and the cause of obstacle is not founded easily for controlling a switch of an optical repeater. Further, it is a defect that an extra procedure compensating the controlling signal by delay value of an optical cable is needed and an extra fee corresponding to this is needed.

Therefore, the plan is demanded which can distinguish between a downlink signal and an uplink signal in the optical repeater itself and generate a switching timing signal to provide a path of each signal selectively in order to use the optical repeater even in the mobile communication system of the TDD scheme.

SUMMARY OF THE INVENTION

Therefore, the present invention has been made in view of the above-mentioned problems, and it is as object of the present invention to provide a method and system for generating switching a timing signal for separating a transmitting and receiving signal in an optical repeater of a mobile telecommunication network by using a Time Division Duplex (hereinafter, referred to as "TDD") scheme and an Orthogonal Frequency Division Multiplexing (hereinafter, referred to as "OFDM") modulation scheme, which transmits a part of a RF signal extracted from a coupler included in a remote of an optical repeater to a switching timing signal generating circuit, locates a frame start position of a RF signal by correlating a reference signal generated in a switching timing signal generating circuit with a RF signal extracted from a coupler, and is capable of transmitting a RF signal by distinguishing between a downlink signal and a uplink signal by using a switching timing signal in a switch when calculating a starting point of a downlink signal and a uplink signal included in an RF signal on the basis of a frame starting location, generating a switching timing signal by using it, and transmitting to a remote's switch.

According to one aspect of the present invention, there is provided a method for generating a switching timing signal used to separate transmission signals in an optical repeater of a mobile communication system including an AP (Access Point), an AT (Access Terminal) and an optical repeater by using a TDD (Time Division Duplex) scheme and an OFDM (Orthogonal Frequency Division Multiplexing) modulation Scheme, the method comprising the steps of (a) transmitting an RF signal received from the AP via a main donor of the optical repeater to a remote of the optical repeater; (b) extracting a part of the RF signal in a coupler of the remote, and transmitting an extracted RF signal to a switching timing signal generating circuit of the remote; (c) correlating the extracted RF signal with a reference signal generated in the switching timing signal generating circuit; (d) detecting a frame start position of the RE signal by analyzing a correlation result; (e) calculating starting points of a downlink signal and an uplink signal included in the RF signal by reference of the frame start position; (f) generating a switching timing signal by using the starting points of the downlink signal and the uplink signal, and transmitting the switching timing signal to a switch of the optical repeater; and (g) separately transmitting the downlink signal from the uplink signal by controlling the switch by using the switching timing signal.

According to another aspect of the present invention, there is provided a switching timing signal generating system for dividing a RF signal received from an AP (Access Point) and an AT (Access Terminal) in a optical repeater of a mobile communication network which employs a TDD (Time Division Duplex) scheme and an OFDM (Orthogonal Frequency Division Multiplexing) modulation scheme into a downlink signal and an uplink signal, the switching timing signal generating system comprising: a main donor of the optical repeater for converting a RF signal received from the AP to an optical signal, transmitting the optical signal to a remote, while converting the optical signal received from the remote into a RF signal, and transmitting the RF signal to the AP; a remote of the optical repeater for converting an optical signal received from the main donor to a RF signal, transmitting the RF signal to AT, while converting a RF signal received from the AT to an optical signal, and transmitting the optical signal to the main donor; and a switching timing signal generating circuit for extracting a part of a RF signal transmitted to the remote from the main donor, correlating an extracted RF signal with a reference signal, detecting a frame start position of the extracted RF signal by analyzing a correlation result, calculating a starting point of the downlink signal and the uplink signal by using the frame start position, and generating a switching timing signal by using the starting point information of the downlink signal and the uplink signal, and transmitting the switching timing signal to a switch.

According to further another aspect of the present invention, there is provided a switching timing signal generating circuit for generating a switching timing signal dividing a RF signal received from an AP (Access Point) and an AT (Access Terminal) in an optical repeater of a mobile communication network which employs a TDD (Time Division Duplex) scheme and an OFDM (Orthogonal Frequency Division Multiplexing) modulation scheme into a downlink signal and an uplink signal, the switching timing generating circuit comprising: a divider for receiving an extracted RE signal and providing the extracted RE signal for a level detector and a Variable Gain Amplifier (hereinafter, referred to as "VGA"), the extracted RE signal being extracted from a coupler included in a remote of the optical repeater as a part of the RE signal transmitted from a main donor of the optical repeater to the remote; a level director for measuring a level of the extracted RF signal received from the divider; a VGA for receiving a level value measured at the level detector, and outputting the extracted RE signal while keeping the extracted RF signal to a steady level; a log-scale amplifier for allowing a variation of the extracted RF signal received from the VGA to convert from a linear scale to a decibel (dB) scale, and transmitting a converted extracted RE signal to a pulse generator; a pulse generator for generating a pulse waveform signal by using the converted extracted RE signal received from the log-scale amplifier, and transmitting the pulse waveform signal to a comparator; a reference pulse generator for generating a reference pulse waveform signal for use in determining a frame start position of the extracted RE signal upon correlating the pulse waveform signal generated in the pulse generator and transmitting the reference pulse waveform signal to the comparator; a comparator for correlating the pulse waveform signal received from the pulse generator with the reference pulse waveform signal received from the reference pulse generator; a timing controller for determining the frame start position of the extracted RF signal by analyzing a correlation result value, calculating a starting point of the downlink signal and the uplink signal included in the RF signal by using the frame start position, and generating the switching timing signal by using the starting point information of the downlink signal and the uplink signal, and transmitting the switching timing signal to a switch of the optical repeater; and a phase tuning circuit for receiving a phase information of the pulse waveform signal generated in the pulse generator, and tuning the phase of the reference pulse waveform signal.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference will now be made in detail to the preferred embodiments of the present invention. The same reference numerals are used to designate the same components as those shown in other drawings. In the following description of the present invention, a detailed description of known configurations and functions incorporated herein will be omitted when it may make the subject matter of the present invention rather unclear.

Figure 2:
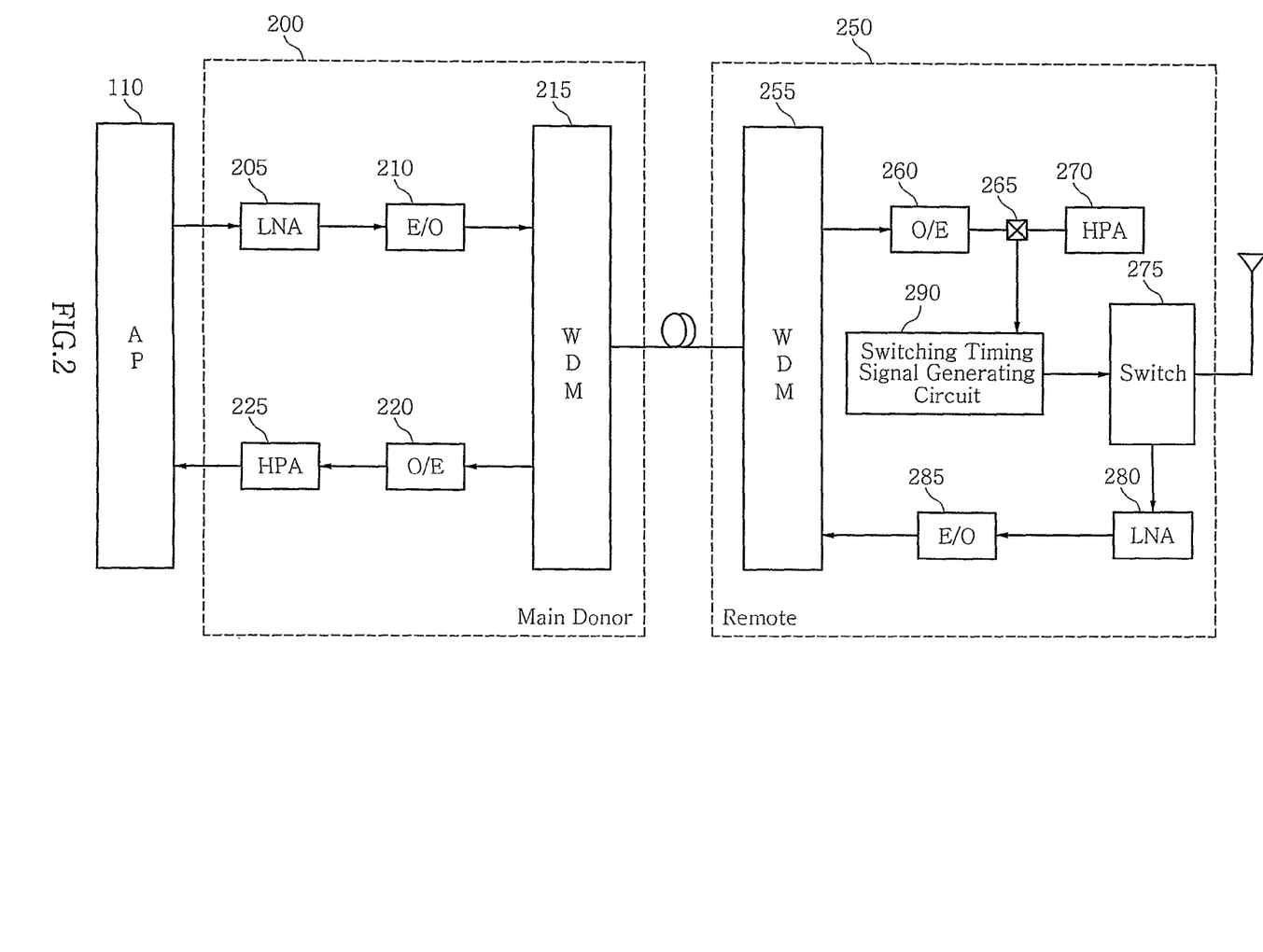
FIG. 2 is a diagram schematically showing the construction of an optical repeater according to a preferred embodiment of the present invention.

FIG. 2 is a diagram schematically showing the construction of an optical repeater according to a preferred embodiment of the present invention.

The optical repeater of the present invention is capable of using a common frequency for both the downlink and the uplink since it operates under a TDD scheme. The optical repeater is operable to transmit a RF signal by using a shared frequency between an AT 100 and an AP 110.

As shown in FIG. 2, the optical repeater according to a preferred embodiment of the present invention may include a main donor 200 and a remote 250.

The main donor of the optical repeater 200, coupled to the AP 110 via a RF cable, receives a RF signal from the AP 110, converts the RF signal to an optical signal by way of E/O conversion, transmits the optical signal to the remote 250 via optical communication cable, converts the optical signal received from the remote 250 to a RF signal by way of O/E conversion, and transmits the RF signal via a RF cable to the AP 110.

The remote 250 of the optical repeater receives an optical signal from the main donor 200, converts the optical signal to a RF signal, transmits the RF signal to the AT 100 via an antenna, converts the RF signal to an optical signal, and transmits the optical signal to the main donor 200 via an optical cable.

The main donor 200 may include a Low Noise Amplifier 205 (hereinafter, referred to as "LNA"), an E/O conversion module 210, a Wavelength Division Multiplexer 215 (hereinafter, referred to as "WDM"), an O/E conversion module 220, a High Power Amplifiers 225 (hereinafter, referred to as "HPA") and etc. as its elements. Meanwhile, the remote 250 may include a WDM, an O/E conversion module 260, a coupler 265, an HPA 270, a switch 275, a LNA 280, an E/O conversion module 285, a switching timing signal generating circuit 290, and etc. as its elements.

Herein, though not illustrated in the figure, the main donor 200 of the optical repeater can expand the coverage of an optical repeater by coupling itself to a plurality of remotes 250 using optical cables. For this, the main donor 200 may include a signal divider and a signal coupler (both not shown) dealing with multi-channels. Further, the main donor 200 divides a RF signal received from the AP 110 using the signal divider, and synthesizes a RF signal received from an HPA 225 and the output of another remote using the signal coupler.

The WDM 215 and 255 is an apparatus capable of dividing an optical fiber channel into a plurality of communication channels. When transmitting an optical signal, the WDM 215 and 255 can operate as a multiplexer for transmitting several optical waves via one optical fiber. Meanwhile, when receiving an optical signal, the WDM 215 and 255 can operate as a demultiplexer for dividing optical wave signals via one optical fiber into multiple signals. The E/O conversion modules 210 and 285 may be implemented by using a Laser Diode, O/E conversion modules 220 and 260 may be implemented by using a Photo Diode.

Figure 3:
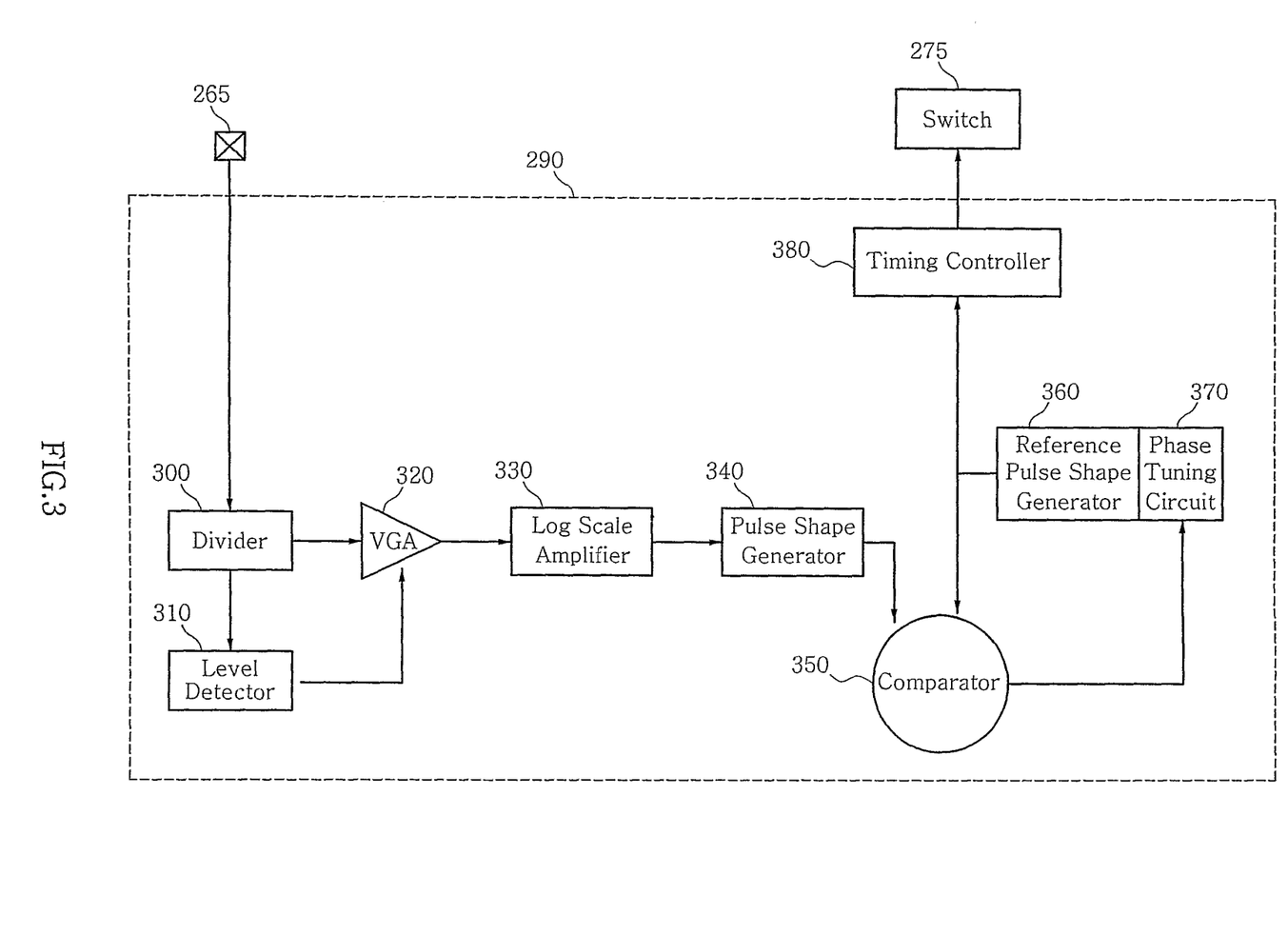
FIG. 3 is a diagram showing the construction of a switching timing signal generating circuit according to a preferred embodiment of the present invention.

The switching timing signal generating circuit 290 generates a switching timing signal for controlling a switch upon separating a downlink signal and an uplink signal after a part of RE signals are extracted from a coupler 265, and transmits the switching time signal to the switch 275. The functional blocks of the switching timing signal generating circuit 290 is illustrated in FIG. 3.

The transmission process of signals in a forward and backward channels by using blocks of the optical repeater will be described in detail.

In a forward channel, a RE signal which has been received through a RF cable is sent to a LNA 205 of a main donor 200. The LNA 205 suppresses noise components of the RF signal, amplifies signal components, and transmits the resultant signal to the E/O conversion module 210, which in turn converts the RE signal to an optical signal and transmits the optical signal to a WDM 215. The WDM 215 transmits a plurality of optical signals received from the E/O conversion module 210 via an optical communication cable to a remote 250.

A WDM 255 of a remote 250 divides a plurality of the optical signal received from the main donor 200 prior to transmitting each to the O/E conversion module 260, which converts the optical signals into RF signals and transmits the RF signals to an HPA 270. Herein, the HPA 270 amplifies the RF signals up to an effective power suitable to wirelessly radiate and transmits the amplified RF signals to a switch 275. The switch 275 radiates the RF signals to the AT 100 via an antenna.

In a backward channel, upon receiving a RF signal from the AT 100 via the antenna of the remote 250, the LNA 250 suppresses noise components of the RF signal, amplifies signal components, and transmits the resultant signal to the E/O conversion module 285. Further, the E/O conversion module 285 converts the RF signal to an optical signal and transmits the optical signal to the WDM 255. The WDM 255 then transmits the optical signal through an optical communication cable to the main donor 200.

The WDM 215 transmits the optical signal received from the remote 250 to the O/E conversion module 220, which converts optical signals to RF signals and transmits the RF signals to a HPA 225. Herein, the HPA 225 amplifies up to an effective power suitable to transmit the RF signals to the AP 110 and transmits amplified RF signals to the AP 110 via a RF cable.

Meanwhile, a coupler 265 extracts part of the RF signals transmitted from the O/E conversion module 220 for the HPA 270, and transmits the extracted RF signals to a switching timing signal generating circuit 290. Herein, the switching timing signal generating circuit 290 analyzes the extracted RF signal, generates a switching timing signal used for transmitting the RF signal, and transmits the switching timing signal to the switch 275. Upon receiving a downlink signal according to the received switching timing signal, the switch 275 renders it to radiate to the AT 100 via an antenna. Further, upon receiving an uplink signal, the switch 275 blocks the path toward the HPA 270, and establishes a path to send the uplink signal to the LNA 280.

FIG. 3 is a block diagram of a switching timing signal generating circuit according to a preferred embodiment of the present invention.

As shown in FIG. 3, the switching timing signal generating circuit 290 operatively includes a divider 300, a level director 310, a Variable Gain Amplifier 320 (hereinafter, referred to "VGA"), a log-scale amplifier 330, a pulse generator 340, a comparator 350, a reference pulse generator 360, a phase tuning circuit 370, a timing controller 380.

The process of generating a switching timing signal by using elements of the switching timing signal generating circuit 290 may be described below in detail.

The coupler 265 extracts part of the RF signal, and transmits the extracted RF signal to the divider 300. The divider 300 divides the extracted RF signals and sends it to both the level detector 310 and a VGA 320. The level detector 310 measures a level of its input and transmits a level value to the VGA 320. Accordingly, the VGA 320 receives the level value and maintains the output signal thereof at a constant level. The log-scale amplifier 330 converts a variation of the signal received from the VGA 320 from a linear scale into a decibel (dB) scale, and then transmits the decibel scale to the pulse generator 340. Herein, the pulse generator 340 generates a pulse waveform signal, and transmits it to the comparator 350.

The reference pulse generator 360 generates a reference pulse waveform signal which the correlation is performed with the pulse waveform signal used for determining a frame start position of the RF signal, and transmits the reference pulse waveform signal to the comparator 350. The comparator 350 produces a degree of correlation by correlating the pulse waveform signal and the reference pulse waveform signal. The timing controller 380 determines a frame start position of the extracted RE signal by analyzing the degree of correlation, and calculates a starting point of a downlink signal or an uplink signal on the basis of the detected frame start position. Herein, the timing controller 380 calculates a starting point of a downlink signal or an uplink signal. The timing controller 380 generates a switching timing signal by using the starting point information of a downlink signal or an uplink signal, and transmits it to the switch 275. The phase tuning circuit 370 receives phase information of the pulse waveform signal, and performs tuning of the phase of the reference pulse waveform signal.

After a switching timing signal is transmitted to the switch 275 by using the processes above, the switching timing signal renders the RF signal transmitted to the switch 275 to be divided into a downlink signal and an uplink signal. In the case that a downlink signal is received from the HPA 270, the switch 275 radiates the downlink signal to the AT 100 via the antenna. On the other hand, when receiving an uplink signal is received, the switch 275 blocks a path connected toward the HPA 270, and establishes a path to transmit the uplink signal to the LNA 280. Therefore, the switch 275 controls open/close thereby according to the switching timing signal, and selectively provides a path for the downlink or the uplink signals.

Figure 4:
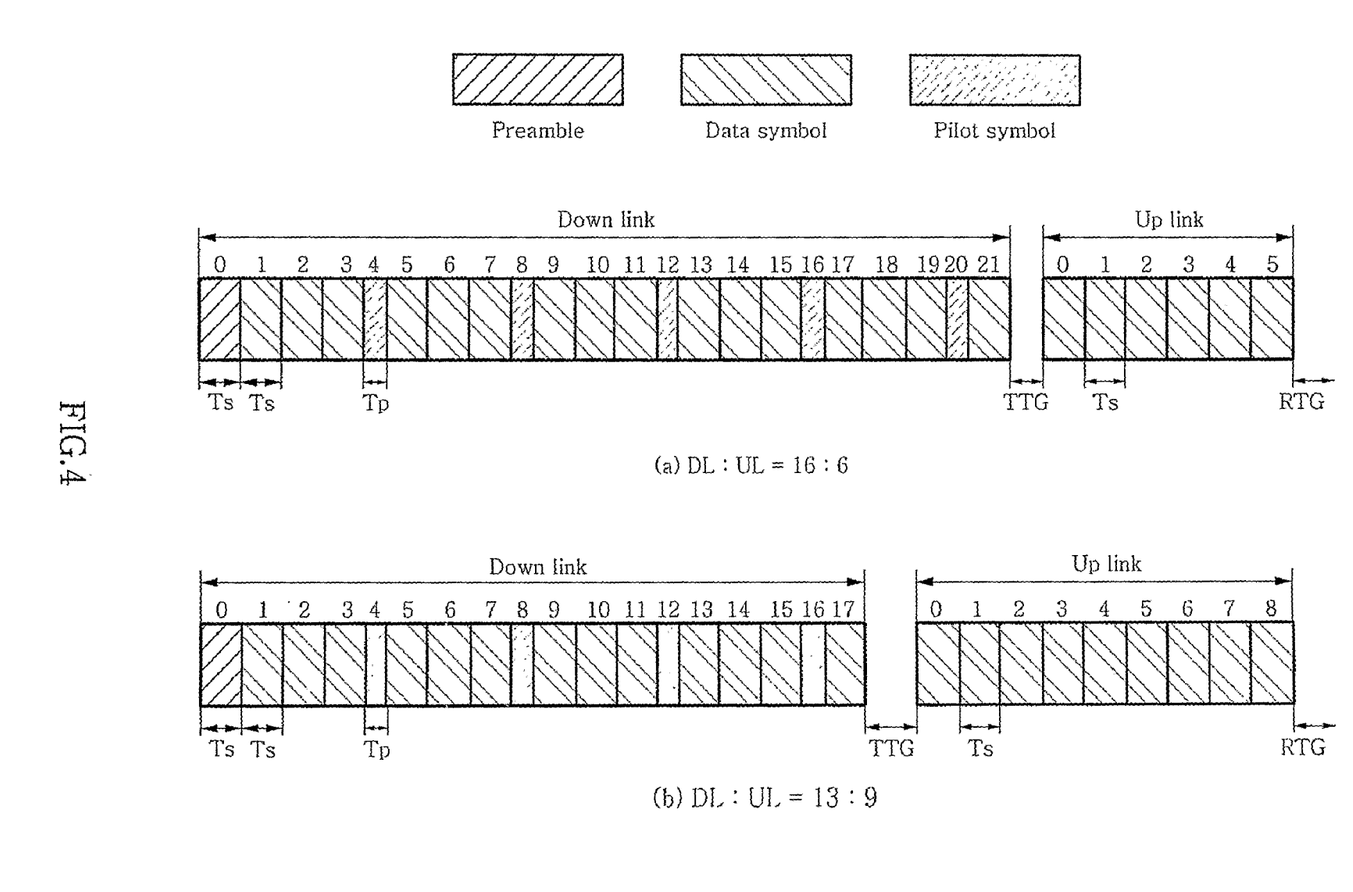
FIG. 4 is a diagram showing the frame structure of a transmitting and receiving signal by using a TDD scheme and an OFDM modulation scheme.

FIG. 4 is a diagram showing the frame structure of a transmitting and receiving signal by using a TDD scheme and an OFDM modulation scheme.

A frame structure of a transmission signal, when using the TDD scheme and the OFDM modulation scheme, will be described by focusing on an HPi system.

A frame in the HPi system has a length of 5 mesc and is comprised of a downlink frame, an uplink frame, a Tx/Rx Transition Gap (hereinafter, referred to as "TTG"), a Rx/Tx Transition Gap (hereinafter, referred to as "RTG"), etc.

Herein, the downlink is a frame for a downlink signal transmitted to the AT 100 via the optical repeater from the AP 110, and the uplink is a frame for an uplink signal transmitted to the AP 110 via the optical repeater from the AT 100. The TTG and the RTG are a Guard Time for separating a transmission intervals of the uplink and the downlink, and during this interval, it is not allowed to transmit signals including effective data at the AP 110 and the AT 100. The TTG is defined as a gap between the downlink and the following uplink, and during this gap, the AP 110 is changed into a mode for receiving an uplink signal, while the AT 100 is changed into a mode for transmitting an uplink signal. The RTG is a gap between the uplink and the following downlink, and during this gap, the AP 110 is changed into a mode for transmitting a downlink signal, while the AT 100 is changed into a mode for transmitting a downlink signal.

The downlink and the uplink which constitutes a frame in the HPi system are comprised of a plurality of OFDM symbols. Further, the OFDM symbols include a data symbol, a pilot symbol and a preamble. Herein, the data symbol, a time interval for data transmission, has a entire time interval (Ts=Tg+Tb) of the sum of a time interval (CP time interval) as much as the last Tg of the effective symbol time interval (Tb) and the effective symbol time interval. The reason to define the time interval of data symbol as the sum of the CP time interval and the effective symbol time interval lies on collecting signals of multipath by using the OFDM scheme and maintaining orthogonality among sub-carriers.

Herein, the preamble, having the Ts as its time interval like the data symbol, is a signal used to synchronize a transmission timing by indicating a point of time of beginning transmission of data. The pilot symbol, having Tp(=Tb/2+Tg) as its time interval, may be used to perceive whether a communication channel is a downlink or an uplink by being inserted in the middle of the data symbol.

The ratio of the data symbol comprising a downlink and an uplink of a frame may support structures of 16:6 and 13:9, the structures of which are shown in FIG. 4. In the figure, (a) shows a frame structure when the ratio is 16:6, and (b) shows a frame structure when the ratio is 13:9.

In case of the downlink, the first OFDM symbol of the downlink is a preamble and a pilot symbol is inserted in every three data symbols, while the uplink is solely comprised of the data symbols. As described above, the time interval between the downlink and the uplink consists of TTG and RTG to separate an uplink/downlink transmission times. The TTG and RTG have integer times of period corresponding to a Sampling Frequency (Fs).

Table 1 shows an individual symbol location of the downlink and the uplink described in FIG. 4.

TABLE 1

| Number of data symbols | | DL:UL = 16:6 | DL:UL = 13:9 |
|---|---|---|---|
| L | Preamble | 0 | 0 |
|  | Pilot symbol | 4, 8, 12, 16, 20 | 4, 8, 12, 16 |
|  | Data symbol | (1), (2, 3, 5), (6, 7, 9), (10, 11, 13), (14, 15, 17), (18, 19, 21) | (1), (2, 3, 5), (6, 7, 9), (10, 11, 13), (14, 15, 17) |
| L | Data symbol | (0, 1, 2), (3, 4, 5) | (0, 1, 2), (3, 4, 5), (6, 7, 8) |

The numbers in Table 1 indicates symbol numbers designated in each symbols among frames illustrated in FIG. 4. Further, resource allocations in terms of time for transmitting data is carried out unit by unit that is grouped by parentheses.

Table 2 shows physical coefficients to the frame structure illustrated in FIG. 4.

TABLE 2

| | | DL:UL = 16:6 | | | DL:UL = 13:9 | |
|---|---|---|---|---|---|---|
| Number of data symbols | | Amount | Length (sample times) | Duration (μs) | Amount | Length (sample times) | Duration (μs) |
| L | Preamble | 1 | 2,176 | 190.5 | 1 | 2,176 | 190.5 |
| | Pilot symbol | 5 | 5,760 | 504.4 | 4 | 4,608 | 403.5 |
| | Data symbol | 16 | 34,816 | 3,048.7 | 13 | 28,288 | 2,477.1 |
| L | Data symbol | 6 | 13,056 | 1,143.3 | 9 | 19,584 | 1,714.9 |
| TTG + RTG | | 1 (each) | 1,292 | 113.1 | 1 (each) | 2,444 | 214.0 |
| Total Duration | | | | 5000 | | | 5000 |

The frames illustrated in FIG. 4 have the physical coefficients as shown in Table 2. Each frame has the length of 5 msec as calculated by adding up symbols of the uplink and the downlink, and time intervals of the TTG and the RTG.

Meanwhile, the uplink and the downlink in a frame may be of asymmetrical structure as described above. In the downlink, it uses a preamble to indicate a point of time to start transmission of data and a pilot symbol to determine a channel. It is, however, possible to use the preamble alone. Further, signals may or may not present according to conditions of communication channel in the data symbol of the uplink and the downlink.

The switching timing signal generating circuit 290 generates a switching timing signal by determining start position of a downlink and an uplink upon receiving a signal having the frame structure as described above.

Figure 5:
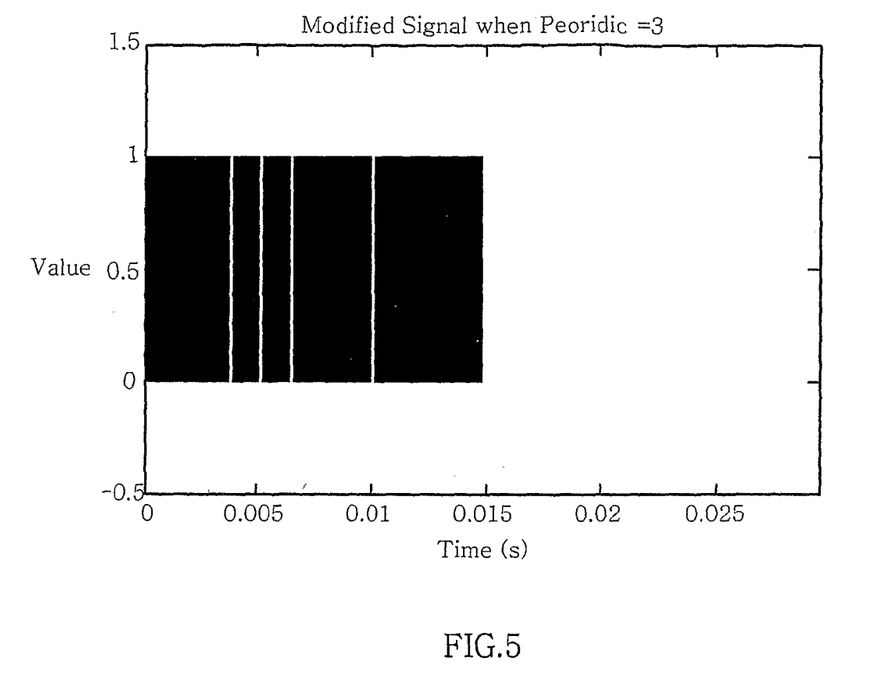
FIG. 5 is an exemplary presentation of a waveform of a signal when a 10% probability of data present in a data symbol of FIG. 4.
Figure 6:
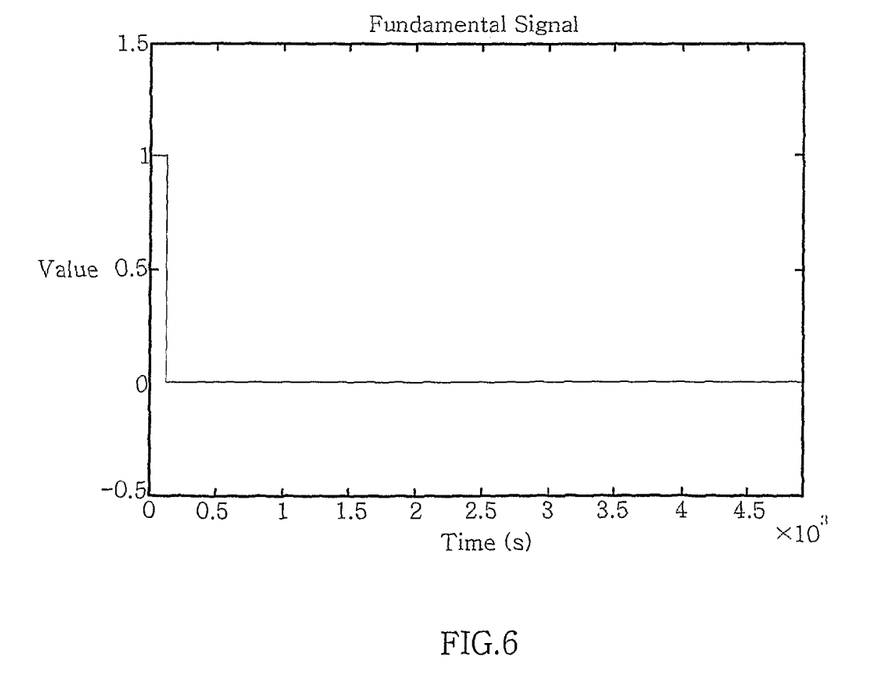
FIG. 6 is exemplary presentation of a waveform of reference signal used for correlation in an optical repeater.
Figure 7:
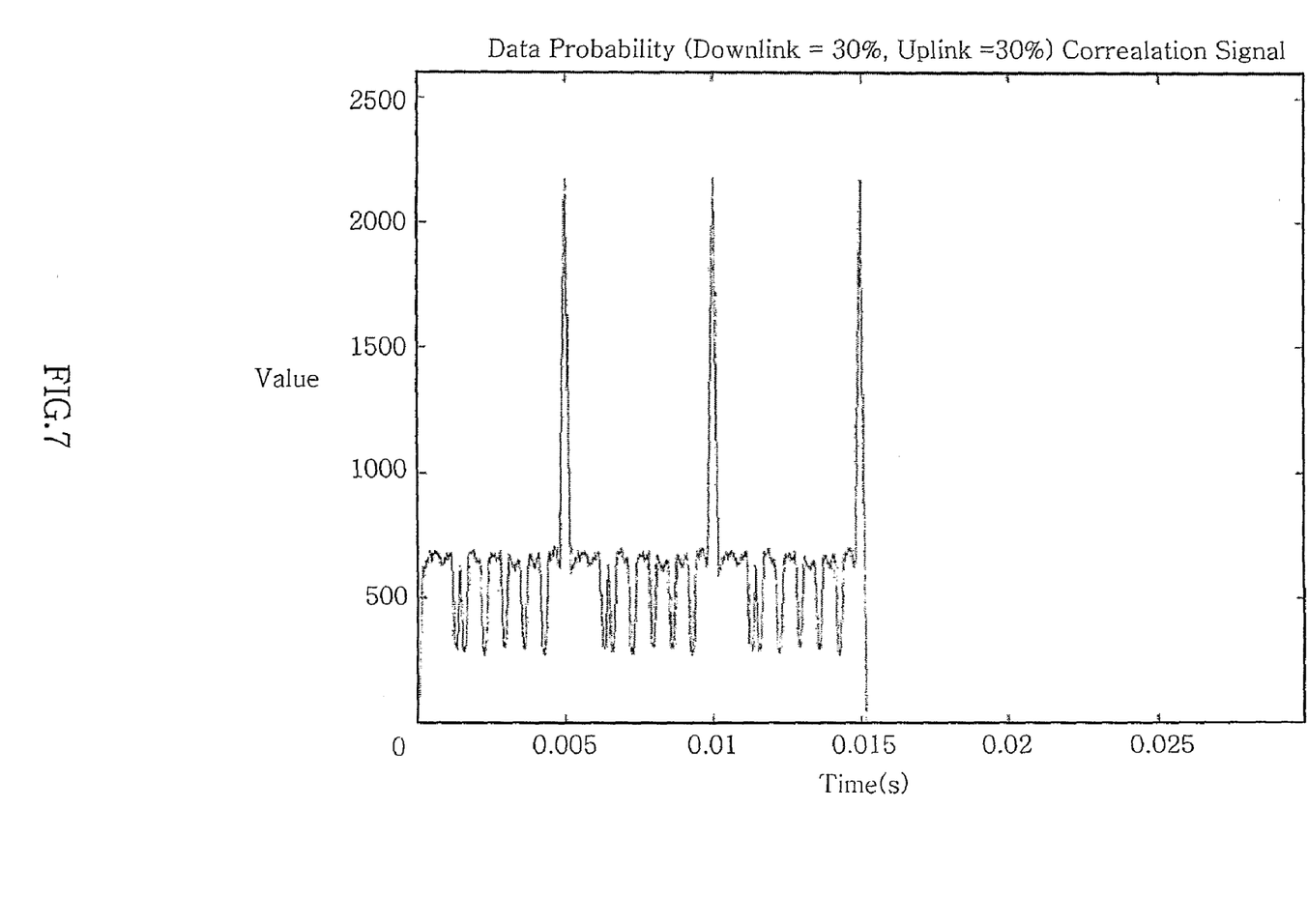
FIG. 7 is an exemplary presentation of a waveform of a signal output resulting from correlating the signals illustrated in FIG. 5 and FIG. 6.

FIG. 5 is an exemplary presentation of a waveform of a signal when a 10% probability of data present in a data symbol of FIG. 4. FIG. 6 is exemplary presentation of a waveform of reference signal used for correlation in an optical repeater. In addition, FIG. 7 is an exemplary presentation of a waveform of a signal output resulting from correlating the signals illustrated in FIG. 5 and FIG. 6.

When the signal illustrated in FIG. 5 has been transmitted to the remote 250 via a main donor 200 of an optical repeater from the AP 110, the coupler 265 of a remote 250 extracts a part of the signal and transmits it to a switching timing signal generating circuit 290. The switching timing signal generating circuit 290 generates a reference signal illustrated in FIG. 6. The signal waveform illustrated in FIG. 7 is obtained by when correlating the reference signal with the received signal illustrated in FIG. 5.

Herein, the reference signal illustrated in FIG. 6 has the signal value '1' from 0 second to 0.015 second to allow correlation in the interval where the received signal exists because the received signal illustrated in FIG. 5 has a signal section from 0 second to 0.015 second.

Meanwhile, it is possible to locate the frame starting point by simply identifying the location of a preamble because a frame starts from a preamble as illustrated in FIG. 4. A preamble signal may be made up of consecutive "1"s because a preamble is not a data symbol but a signal used to synchronize transmission timing by indicating a starting time point of a data symbol. That is, a reference signal is equal to a signal value in a preamble and therefore, the result value is at its maximum at a point of time in a preamble and this location of maximum becomes the start position of each frame, when correlating the received signal of FIG. 5 with the reference signal of FIG. 6. As a result, the location of the maximum value in the signal waveform illustrated in FIG. 7 becomes the start position of a frame.

As described in FIG. 4, it is possible to calculate a starting point of a downlink and uplink by calculating a time interval set in each symbol of a frame upon locating a start position of a frame because a frame structure including a uplink and downlink is known. That is, a start position of a frame is a starting point of a downlink because a frame begins with a downlink. Further, a location adding a TTG to a time interval of a downlink becomes a starting point of an uplink. Therefore, in the exemplary waveform of FIG. 7, 0.005 second, 0.01 second and 0.015 second at maximum values become a starting point of each frame. Further, starting points of an uplink and a downlink can be derived by reference of these become starting points of an uplink signal and a downlink signal.

The switching timing signal generating circuit 290 controls a switch by generating switching timing signals on the basis of starting points of a downlink signal and an uplink signal. As a result, it is possible to separate a downlink signal from an uplink signal to selectively provide a transmission path for each signal in the optical repeater.

Meanwhile, as described above, it is possible to generate a switching timing signal separating for either a downlink signal or an uplink signal even when using the preamble alone or the ratio of a data symbol changes since every frame begins with a preamble and it is possible to locate a start position of a frame because a result value of correlation becomes its maximum at a time interval where a preamble is located.

Figure 8:
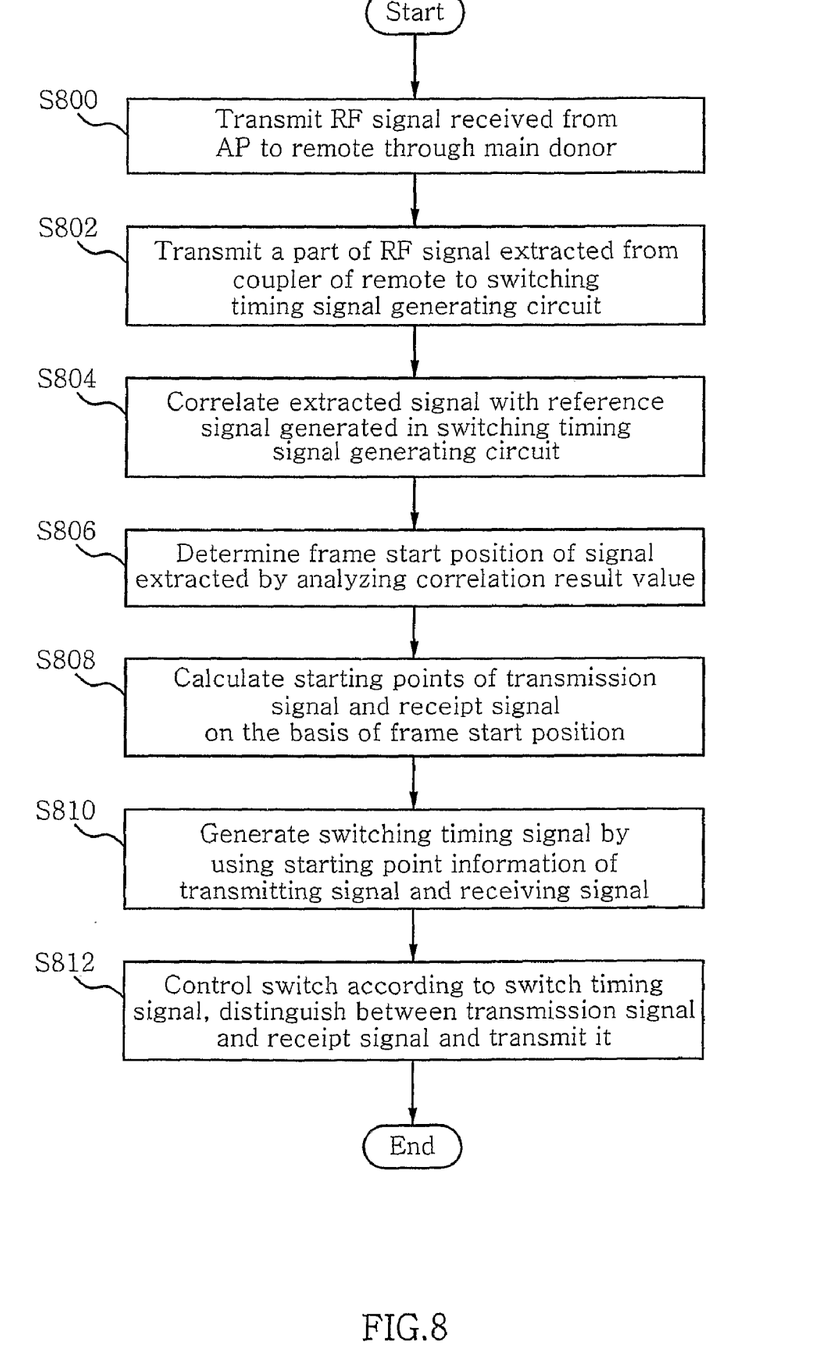
FIG. 8 is a flow diagram illustrating a switching timing signal generating process for separating transmission signals in an optical repeater of a mobile communication network using a TDD scheme and an OFDM modulation scheme according to a preferred embodiment of the present invention.

FIG. 8 is a flow diagram illustrating a switching timing signal generating process for separating transmission signals in an optical repeater of a mobile communication network using a TDD scheme and an OFDM modulation scheme according to a preferred embodiment of the present invention.

AS illustrated in FIG. 8, the main donor 250 of an optical repeater receives a RF signal transmitted from the AP 110, converts the RF signal to an optical signal, and transmits the optical signal to a remote 250 through an optical communication cable (S800). The remote 250 converts the received optical signal to a RF signal, and transmits the RF signal to the AT 100. The coupler 265 located inbetween the O/E conversion module of the remote 250 and the HPA 270 extracts a part of the RF signal, and transmits the part to the switching timing signal generating circuit 290 (S802). The switching timing signal generating circuit 290 performs correlation between the signal transmitted from the coupler 265 and the reference signal generated in the reference pulse generator of the switching timing signal generating circuit 290 (S804). As a result of the correlation, the location showing the maximum value at the waveform is determined to be a start location of a frame, the start position of a frame is determined by analyzing the waveform (S806).

Since the frame structure of the signal using the TDD scheme and the OFDM modulation scheme can be known as described in FIG. 4, the switching timing signal generating circuit 290 calculates a starting point of a downlink signal and uplink signal included in the RF signal on the basis of a frame starting point (S808). When the calculation of the starting points of the downlink signal and uplink signal is done, the switching timing signal generating circuit 290 generates a switching timing signal for distinguishing the downlink signal from the uplink signal, and transmits the switching timing signal to the switch 275 (S810). The switch 275, upon receiving the switching timing signal, separately perceives the downlink signal and the uplink signal, controls the operation of the switch 275, and then selectively provides path for each signal (S812). Therefore, the optical repeater prevents interference between the downlink signal and uplink signal by using the switching timing signal. Further, the optical repeater replays the transmission of signal between the AP 110 and the AT 100 by transmitting the signal to the AT 100 in the case of the downlink signal, and transmitting the signal to the AP 110 in the case of the uplink signal.

According to the present invention as described above, stable operation of an optical repeater can be achieved since the optical repeater in a mobile communication network using the TDD scheme and the OFDM scheme separates a downlink signal and an uplink signal, generates a switching timing signal to selectively provide a path for each separated signal, to control a switch.

Further, no modem is necessary to receive a switching control signal and no extra process is needed to compensate for a delay in an optical cable since the transmission signals are separated in the optical repeater itself.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A method for generating a switching timing signal for separating transmission signals into downlink signal(s) and uplink signal(s) in an optical repeater of a mobile communication system including an AP (Access Point), an AT (Access Terminal), a main donor and a remote each having a wavelength division multiplexer (WDM) with the optical repeater using a TDD (Time Division Duplex) scheme and an OFDM (Orthogonal Frequency Division Multiplexing) modulation scheme, the method comprising the steps of:

(a) transmitting an RF signal received from the AP via the main donor of the optical repeater to the remote in the optical repeater;

(b) extracting a part of the RF signal from a coupler in the remote, and transmitting the RF signal extracted from the coupler to a switching timing signal generating circuit in the remote;

(c) deriving a pulse waveform signal from the extracted RF signal;

(d) generating a reference pulse waveform based on a preamble of the RF signal;

(e) correlating the pulse waveform signal from step (c) with the reference pulse waveform generated in step (d) to form a correlated comparison signal;

(f) transmitting the correlated comparison signal from step (e) to a timing controller;

(g) determining a frame start position directly from the output of said timing controller;

(h) using the frame start position of step (g) to calculate a starting point for the downlink signal and for the uplink signal;

(i) generating a switching timing signal by using the starting point information of the downlink signal and the uplink signal, and transmitting the switching timing signal to a switch of the optical repeater; and (j) using the switching timing signal for separately transmitting the downlink signal from the uplink signal.

2. The method as claimed in claim 1, wherein, at step (g), the frame start position is determined as a position having a maximum correlation value.

3. The method as claimed in claim 1, wherein, at step (i), according to the switching timing signal, the switch radiates the downlink signal to the AT, blocks a path connecting an HPA (High Power Amplifier) of the remote when radiating the downlink signal, and establishes a path to transmit the uplink signal to a LNA (Low Noise Amplifier) of the remote.

4. The method as claimed in claim 1, wherein a frame of the RF signal includes a downlink frame, an uplink frame, a Tx/Rx Transition Gap (hereinafter, referred to as "TTG") and a Rx/Tx Transition Gap ((hereinafter, referred to as "RTG").

5. The method as claimed in claim 4, wherein the frame has the length of 5 msec as a result of adding all time intervals of the downlink, the uplink, the TTG and the RTG.

6. The method as claimed in claim 4, wherein the downlink and the uplink is comprised of a plurality of OFDM symbols, the OFDM symbols including a data symbol, a pilot symbol and a preamble.

7. The method as claimed in claim 6, wherein a ratio of the data symbol comprising the downlink and the uplink of the frame has an asymmetric structure of 16:6 or 13:9.

8. The method as claimed in claim 6, wherein a first OFDM symbol of the downlink is the preamble and a pilot symbol is inserted in every three data symbols, and the uplink is comprised of the data symbols.

9. The method as claimed in claim 6, wherein a first OFDM symbol of the downlink is the preamble and the remaining OFDM is comprised of the data symbols, and the uplink is comprised of the data symbols.

10. The method as claimed in claim 6, wherein the data symbol has an entire time interval represented by ($Ts=Tg+Tb$) wherein Ts is the entire time interval, Tg is a partial time interval of Tb and Tb is an effective symbol time interval.

11. The method as claimed in claim 10, wherein the preamble has the Ts as its time interval, and is used to synchronize a transmission timing by notifying a point of time to start transmission of data.

12. The method as claimed in claim 10, wherein the pilot symbol has Tp ($=Tb/2+Tg$) as its time interval, and is used to determine whether a communication channel is a downlink or an uplink by being inserted in the middle of the data symbol.

13. The method as claimed in claim 4 wherein the downlink is a frame for a downlink signal transmitted from the AP via the optical repeater to the AT, and the uplink is a frame for an uplink signal transmitted from the AT via the optical repeater to the AP.

14. The method as claimed in claim 13, wherein the TTG is a Guard Time between the transmission time of the downlink and the following uplink for isolating a transmission time of the downlink from that of the uplink, and during the TGG, the AP is changed into a mode for receiving the uplink while the AT is changed into a mode for transmitting the downlink.

15. The method as claimed in claim 13, wherein the RTG is a Guard Time between the transmission time of the uplink' and the following downlink for isolating a transmission time of the uplink from that of the downlink, and during the TGG, the AP is changed into a mode for receiving the downlink while the AT is changed into a mode for transmitting the uplink.

16. The method as claimed in claim 7 or claim 15, wherein during the TTG or the RTG, each of the AP and the AT does not transmit a signal including effective data.

17. The method as claimed in claim 13, wherein in step (g), the frame start position is determined as the starting point of the downlink and a location of a TTG plus a time interval of the downlink is determined as the starting point of the uplink, and then the starting point of the downlink is set as the starting point of the downlink signal and the starting point of the uplink is set as the starting point of the uplink signal.

18. A switching timing signal generating system for dividing a RF signal received from an AP (Access Point) and an AT (Access Terminal) in a optical repeater of a mobile communication network into a downlink signal and an uplink signal using a TDD (Time Division Duplex) scheme and an OFDM (Orthogonal Frequency Division Multiplexing) modulation scheme, the switching timing signal generating system comprising:
a main donor and a remote with said main donor having means for converting a RF signal received from the AP to an optical signal and for transmitting the optical signal to the remote, while converting the optical signal received from the remote into a RF signal, and transmitting the RF signal to the AP;
with said remote having means for converting an optical signal received from the main donor to a RF signal, transmitting the RF signal to AT, while converting a RF signal received from the AT to an optical signal, and transmitting the optical signal to the main donor; and
a switching timing signal generating circuit located in the remote including a coupler for extracting a part of an RF signal transmitted to the remote from the main donor, a pulse shape generator for deriving a pulse waveform signal from the RF signal extracted from the coupler, a reference pulse generator for generating a reference pulse waveform based on a preamble of the RF signal, a comparator for making a correlated comparison signal by correlating the pulse waveform signal with the reference pulse waveform, a timing controller for determining a frame start position for the extracted RF signal based on the output of the timing controller; wherein said timing controller calculates a starting point for the downlink signal and for the uplink signal from the frame start position; and wherein the switching timing signal generating circuit generates a switching timing signal using the starting point information of the downlink signal and the uplink signal, and transmits the switching timing signal to a switch located in said remote.

19. The switching timing signal generating system as claimed in claim 18, wherein the AP transmits the RF signal to the AT through the optical repeater and receives the RF signal transmitted by the AT through the optical repeater while the AT receives the RF signal transmitted by the AP through the optical repeater and transmits the RF signal to the AP through the optical repeater.

20. The switching timing signal generating system as claimed in claim 19, wherein the main donor of the optical repeater includes a Low Noise Amplifier (hereinafter, referred to as "LNA"), an E/O conversion module, a Wavelength Division Multiplexer (hereinafter, referred to as "WDM"), an 0/E conversion module, a High Power Amplifiers (hereinafter, referred to as "HPA").

21. The switching timing signal generating system as claimed in claim 19, wherein the remote of the optical repeater includes a Wavelength Division Multiplexer (hereinafter, referred to as "WDM"), an 0/E conversion module, an High Power Amplifier (hereinafter, referred to as "HPA"), a switch, a Low Noise Amplifier (hereinafter, referred to as "LNA") and an E/O conversion module.

22. The switching timing signal generating system as claimed in claim 18, wherein the main donor of the optical repeater transmits a RF signal to the AP through a RF cable and receives a RF signal from the AP.

23. The switching timing signal generating system as claimed in claim 18 or claim 19, wherein the main donor of the optical repeater includes a Low Noise Amplifier (hereinafter, referred to as "LNA"), an E/O conversion module, a Wavelength Division Multiplexer (hereinafter, referred to as "WDM"), an 0/E conversion module, a High Power Amplifiers (hereinafter, referred to as "HPA").

24. The switching timing signal generating system as claimed in claim 23, wherein the main donor is coupled with the remote of a plurality of the optical repeaters through an optical communication cable.

25. The switching timing signal generating system as claimed in claim 24, wherein the main donor includes a signal divider and a signal coupler dealing with multi-channels.

26. The switching timing signal generating system as claimed in claim 18 or claim 19, wherein the remote of the optical repeater includes a Wavelength Division Multiplexer (hereinafter, referred to as "WDM"), an 0/E conversion module, an High Power Amplifier (hereinafter, referred to as "HPA"), a switch, a Low Noise Amplifier (hereinafter, referred to as "LNA") and an E/O conversion module.

27. The switching timing signal generating system as claimed in claim 26, wherein said coupler is located in between the 0/E conversion module and the HPA, for extracting a part of the RF signal transmitted from the 0/E conversion module to the HPA, and transmitting the RF signal to the switching timing signal generating circuit.

28. The switching timing signal generating system as claimed in claim 27, wherein the switching timing signal generating circuit receives the RF signal extracted from the coupler, generates the switching timing signal, and transmits the switching timing signal to the switch.

29. A switching timing signal generating circuit for generating a switching timing signal for dividing a RF signal received from an AP (Access Point) and an AT (Access Terminal) in an optical repeater of a mobile communication network into a downlink signal and an uplink signal using a TDD (Time Division Duplex) scheme and an OFDM (Orthogonal Frequency Division Multiplexing) modulation scheme, the switching timing signal generating circuit comprising:
a divider for receiving an extracted RF signal and providing the extracted RF signal for a level detector and a Variable Gain Amplifier (hereinafter, referred to as "VGA"), the extracted RF signal being extracted from a coupler included in a remote of the optical repeater as a part of the RF signal transmitted from a main donor of the optical repeater to the remote;

a level detector for measuring a level of the extracted RF signal received from the divider;

a VGA for receiving a level value measured at the level detector, and outputting the extracted RF signal while keeping the extracted RF signal to a steady level;

a log-scale amplifier for allowing a variation of the extracted RF signal received from the VGA to convert from a linear scale to a decibel (dB) scale, and transmitting a converted extracted RF signal to a pulse generator;

a pulse generator for generating a pulse waveform signal by using the converted extracted RF signal received from the log-scale amplifier, and transmitting the pulse waveform signal to a comparator;

a reference pulse generator for generating a reference pulse waveform signal for use in determining a frame start position of the extracted RF signal upon correlating the pulse waveform signal generated in the pulse generator and transmitting the reference pulse waveform signal to the comparator;

a comparator for correlating the pulse waveform signal received from the pulse generator with the reference pulse waveform signal received from the reference pulse generator;

a timing controller for determining the frame start position of the extracted RF signal by analyzing a correlation result value, calculating a starting point of the downlink signal and the uplink signal included in the RF signal by using the frame start position, and generating the switching timing signal by using the starting point information of the downlink signal and the uplink signal, and transmitting the switching timing signal to a switch of the optical repeater; and a phase tuning circuit for receiving a phase information of the pulse waveform signal generated in the pulse generator, and tuning the phase of the reference pulse waveform signal.

30. The switching timing signal generating circuit as claimed in claim 29, wherein the timing controller detects the frame start position of the extracted RF signal as a location where the correlation result value is the maximum by analyzing the correlation result value.

31. The switching timing signal generating circuit as claimed in claim 29, wherein the switching timing signal separates the RF signal transmitted to the switch into a downlink signal and an uplink signal, controls the switch to radiate the downlink signal to the AT 100 through an antenna when receiving the downlink signal, and controls the switch to transmit the uplink signal to the LNA of the remote when receiving the uplink signal through the antenna.

* * * * *